(12) United States Patent
Monden et al.

(10) Patent No.: US 7,792,087 B2
(45) Date of Patent: Sep. 7, 2010

(54) NETWORK SYSTEM

(75) Inventors: Kazuya Monden, Yokohama (JP); Susumu Matsui, Machida (JP); Shoji Fukuzawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 943 days.

(21) Appl. No.: 11/603,704

(22) Filed: Nov. 21, 2006

(65) Prior Publication Data

US 2007/0165585 A1 Jul. 19, 2007

(30) Foreign Application Priority Data

Jan. 18, 2006 (JP) ............................. 2006-009387

(51) Int. Cl.
*H04W 4/00* (2009.01)
(52) U.S. Cl. .............. 370/338; 370/395.52; 370/395.53
(58) Field of Classification Search ................. 370/338, 370/349, 389, 310–310.1, 315, 351–356, 370/392, 395.3, 395.52, 395.53; 455/445, 455/13.1, 15, 500, 422.1
See application file for complete search history.

(56) References Cited

U.S. PATENT DOCUMENTS

| | | | | |
|---|---|---|---|---|
| 6,307,843 B1 * | 10/2001 | Okanoue | .................... | 370/312 |
| 2002/0124107 A1 * | 9/2002 | Goodwin | .................... | 709/242 |
| 2003/0035398 A1 * | 2/2003 | Sato | .......................... | 370/338 |
| 2005/0047364 A1 * | 3/2005 | Matsukura et al. | .......... | 370/328 |
| 2005/0068933 A1 * | 3/2005 | Kokkonen et al. | .......... | 370/349 |
| 2008/0117854 A1 * | 5/2008 | Saifullah et al. | ............ | 370/315 |

FOREIGN PATENT DOCUMENTS

JP 2003-060656 2/2003

* cited by examiner

*Primary Examiner*—Kamran Afshar
(74) *Attorney, Agent, or Firm*—Townsend and Townsend and Crew LLP

(57) ABSTRACT

In a network system including a first relay connected to a wire network and a radio network, a second relay for relaying data in the radio network, a first terminal connected by wireless to the first relay, and a second terminal connected by wireless to the second relay, the first relay keeps first information indicating a correspondence between an address of the second terminal, an identifier of a group to which the second terminal belongs, and an identifier of the second relay and second information indicating a correspondence between identifiers of groups formed by virtually subdividing the wire network and an identifier of a group to which the second terminal belongs, and the first relay transmits a packet according to the first or second information.

5 Claims, 8 Drawing Sheets

FIG. 2

| TAG | I/F | ESSID |
|---|---|---|
| Vlan1(6-1) | eth0 | essid1 |
| Vlan2(6-2) | eth0 | essid2 |

FIG. 3A

| TERMINAL IP ADDRESS | ESSID | AP IP ADDRESS |
|---|---|---|
| 4-3 | essid1 | 3-2 |
| 4-4 | essid2 | 3-3 |

FIG. 3B

| TERMINAL IP ADDRESS | ESSID | AP IP ADDRESS |
|---|---|---|
| 4-3 | essid1 | 3-2 |
| 4-4 | essid2 | 3-3 |
| 6-1 | essid1 | 3-1 |
| 6-2 | essid2 | 3-1 |

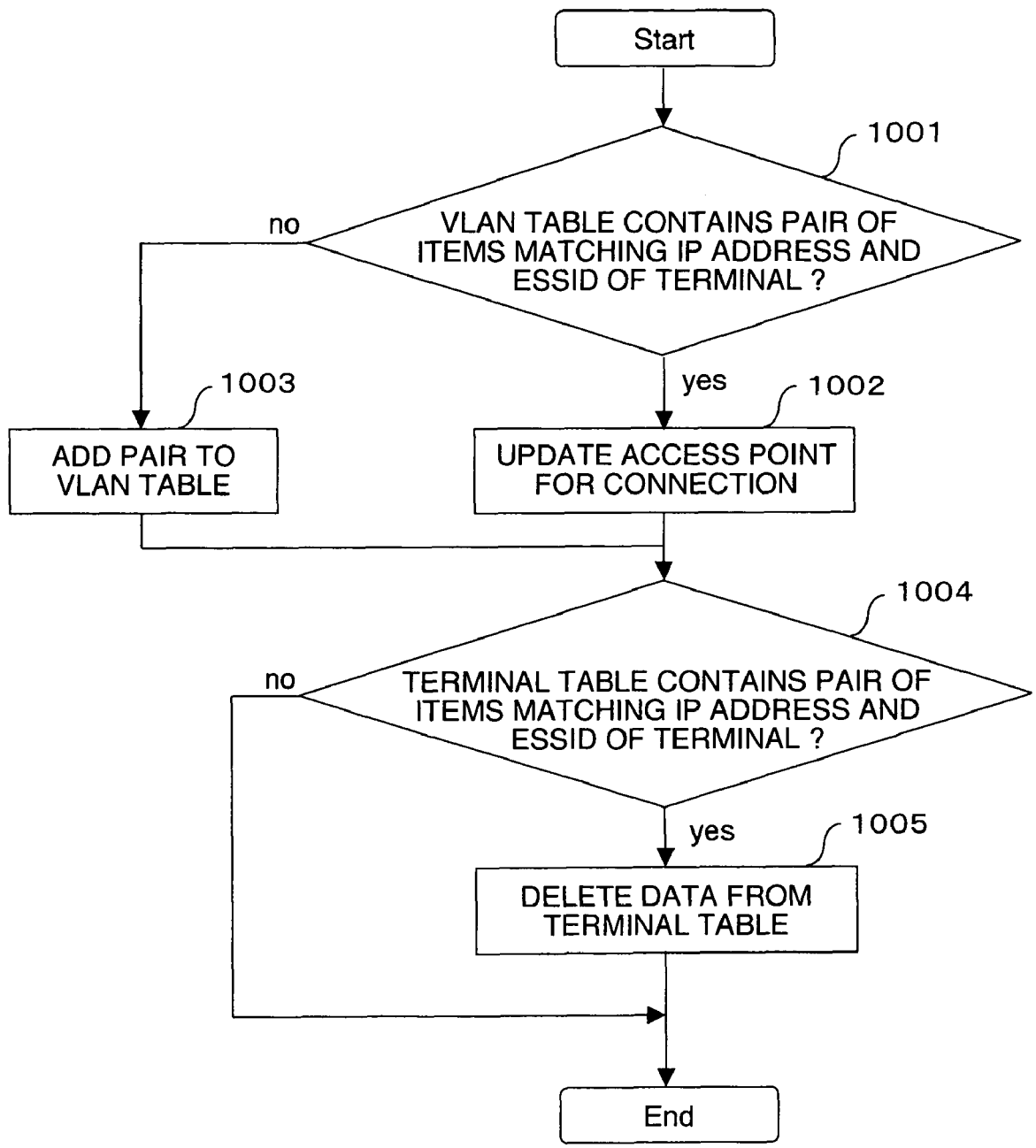

NETWORK SYSTEM

INCORPORATION BY REFERENCE

The present application claims priority from Japanese application JP2006-009387 filed on Jan. 18, 2006, the content of which is hereby incorporated by reference into this application.

BACKGROUND OF THE INVENTION

The present invention relates to a technique to conduct radio or wireless communication.

As a technique for a wire Local Area Network (LAN) in which one physical LAN is subdivided into a plurality of virtual LANs (VLANs), there exists a technique in which a VLAN tag (to be simply referred to as a tag hereinbelow) stipulated by IEEE802.1Q is added to a packet to identify, according to the tag, an LAN to which the packet belongs.

There also exists a technique to implement, by use of a relay or repeater (also an access point to be abbreviated to as AP hereinbelow; reference is to be made to JP-A-2003-60656). According to JP-A-2003-60656, there exists a plurality of access points (to be referred to as interconnecting access points hereinbelow) to interconnect a wire LAN and a radio LAN to each other and a plurality of access points (to be referred to as radio access points hereinbelow) to relay data in a radio LAN. Each AP keeps therein a combination table including combinations of tags and unique IDentifiers (IDs) such as an MAC address and an IP address of terminals which conduct communication. As a result, it is possible for even a terminal which cannot directly communicate with an interconnecting AP to communicate via a radio AP with the interconnecting AP as well as with the VLAN in the radio LAN.

SUMMARY OF THE INVENTION

In JP-A-2003-60656, consideration has not been given to the routing in each access point. This leads to a problem in which each packet sent from a terminal or a device on a wire LAN is broadcast to all radio LANs and hence tremendous load is imposed onto the networks.

It is therefore an object of the present invention to provide a system to suppress the tremendous load imposed onto the system by appropriately conducting the routing operation in each access point.

The object is achieved according to one aspect of a network system of the present invention as follows.

According to the present invention, there is provided a network system including a first relay connected to a wire network and a radio network, a second relay for relaying data in the radio network, a first terminal connected by wireless to the first relay, and a second terminal connected by wireless to the second relay. The first relay keeps therein first information indicating a correspondence established between an address of the second terminal, an identifier of a group to which the second terminal belongs, and an identifier of the second relay and second information indicating a correspondence established between identifiers of groups formed by virtually subdividing the wire network and an identifier of a group to which the second terminal belongs. The first relay transmits a packet according to the first or second information.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing an example of a tag table;

FIGS. 3A and 3B are diagrams showing examples of a routing table;

FIG. 10 is a flowchart showing a flow of table update processing.

DESCRIPTION OF THE EMBODIMENTS

Figure 1:
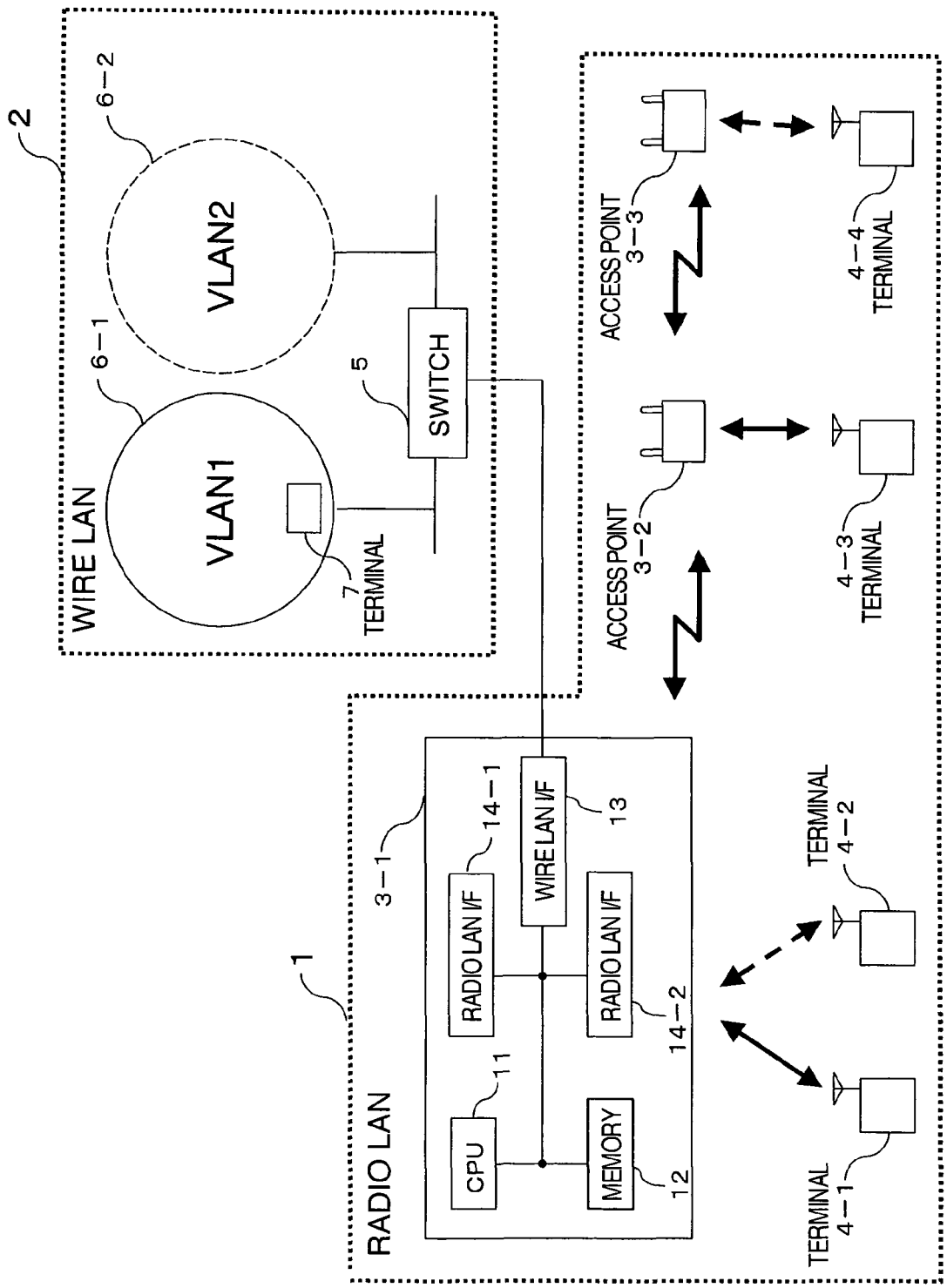
FIG. 1 is a block diagram showing a network system.

Referring now to the drawings, description will be given of embodiments according to the present invention.

First Embodiment

FIG. 1 shows a network in a block diagram.

The system of FIG. 1 includes a radio LAN 1 and a wire LAN 2.

The radio LAN 1 includes access points 3 (3-1 to 3-3) and terminals 4 (4-1 to 4-4) to be connected via radio communication to the access points 3. The access point 3-1 is an interconnecting access points and the access points 3-2 and 3-3 are radio access points.

The wire LAN 2 includes a switch 5 to be connected to the access point 3-1, VLANs 6 (6-1 and 6-2), and a terminal 7 in the VLAN 6-1.

The access point 3-1 includes a central processing unit (CPU) 11, a memory 12, a wire LAN interface (I/F) 13, and radio LAN interfaces 14 (14-1 and 14-2). Although the access points 3-2 and 3-3 are similar in structure to the access point 3-1, the access points 3-2 and 3-3 conduct only communication of data in the radio LAN, and hence the wire LAN I/F 13 may be dispensed with.

The CPU 11 carries out processing by executing programs in the memory 12. It is also possible that a storage is separately disposed to store programs therein such that the CPU 11 reads the programs from the storage to load the programs in the memory 12 for execution thereof.

The wire LAN I/F 13 conducts communication via the switch 5 with the VLAN 6.

The radio LAN I/F 14-1 communicates with the access points other than the access point in which the radio LAN I/F 14-1 is disposed. The radio LAN I/F 14-2 communicates with terminals directly connected to the access points. To establish communication between the access points, an ad hoc mode of radio LAN is employed. For communication between the access point and the terminal, there is used an infrastructure mode or an ad hoc mode of radio LAN.

The access point 3 configured as above conducts path control or a routing operation in an ad hoc network in which a communication path is autonomously constructed on the radio LAN. There may be employed a routing protocol which has been discussed for standardization in the Internet Engineering Task Force (IETF).

To transfer a packet received from the VLAN 6 to the access point 3-1, the switch 5 adds a tag to the packet. To transfer a packet received from the access point 3-1 to the VLAN 6, the switch 5 removes the tag from the packet.

The memory (or the storage) 12 of the access point 3 stores therein various information items such as a tag table, a VLAN table, a routing table, and a terminal table.

FIG. 2 shows an example of the tag table. Each entry of the tag table includes a tag 21, an I/F 22 connected to the VLAN 6, and an Extended Service Set Identifier (ESSID) 23. When a packet is received, the access point 3-1 makes a check to determine whether or not information such as a tag is added to the packet. In the description below, an operation to add such information to a packet is called "encapsulation" and an operation to remove the information from the packet is called "de-capsulation". A packet with a tag is called "tagged packet".

FIGS. 3A and 3B show examples of the VLAN table. Each entry of the VLAN table includes an IP address 31 of a terminal connected to an access point other than the access point associated with the pertinent VLAN, an ESSID 32 of the terminal, and an IP address of an access point to which the terminal is connected. The VLAN table records only the IP addresses of the terminals each of which has established a radio link with an access point.

Figure 4A:
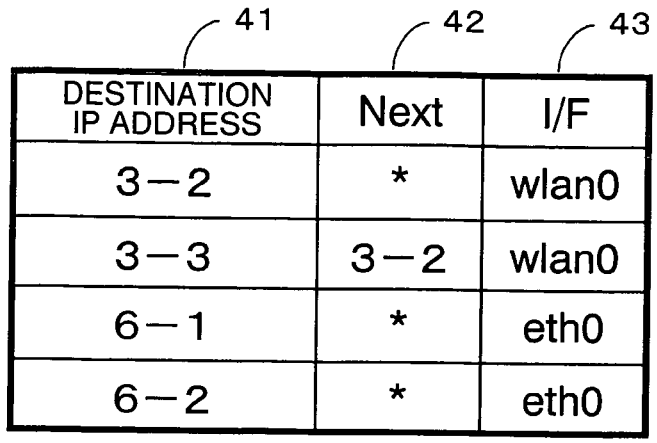
FIGS. 4A and 4B are diagrams showing examples of a VLAN table.
Figure 4B:
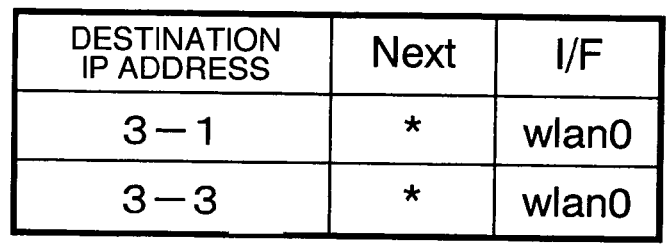

FIGS. 4A and 4B show examples of the routing table. Each entry of the routing table includes a destination IP address 41 of a destination terminal (a terminal as a target place of data), a next field 42 to record a next transfer destination of the packet, and an interface 43 to transmit the packet. An asterisk (*) in the next field 42 indicates that data can be directly sent to the IP address described in the field 41. The routing table is constructed by a routing function of the ad hoc network.

Figure 5A:
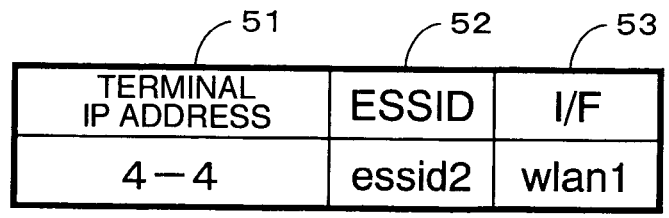
FIGS. 5A and 5B are diagrams showing examples of a terminal table.
Figure 5B:
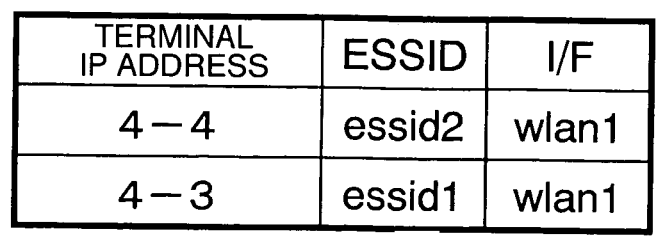

FIGS. 5A and 5B show examples of the terminal table. Each entry of the terminal table includes an IP address 51 of a terminal existing on a radio LAN, an ESSID 52 of the terminal, and an interface 53 to communicate with the terminal.

Figure 6:
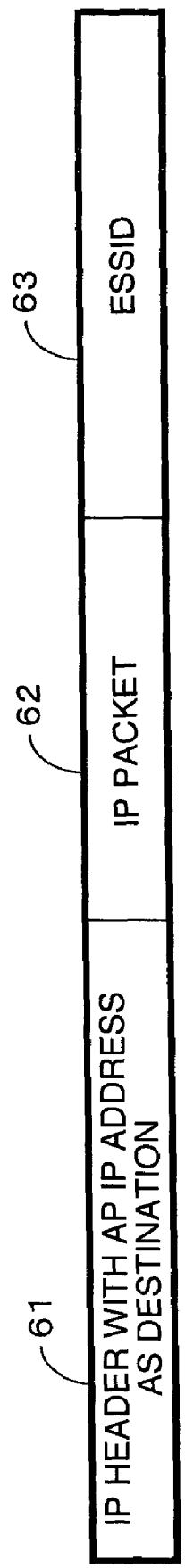
FIG. 6 is a diagram showing an example of a packet.

FIG. 6 shows an example of a packet. The packet includes an IP header 61 including an AP IP address as a destination, an IP packet 62 as real data (including the IP address of the destination terminal), and an ESSID 63 of the destination terminal. A packet to which the IP header 61 and the ESSID 63 are added is referred to as a capsule packet, and a packet to which neither the IP header 61 nor the ESSID 63 is added is referred to as an non-capsule packet.

In this connection, the VLAN 6-1 and the VLAN 6-2 are independent of each other. Therefore, terminals belonging to mutually different VLANs may have one and the same IP address depending on cases. In the embodiment, the terminals 4-1 and 4-2 have an equal IP address and the terminals 4-3 and 4-4 have an equal IP address. The access point 3 configures an ad hoc network using an IP address thereof.

In the first embodiment, it is assumed that the terminals 4-1 and 4-3 belong to the VLAN 6-1 the terminals 4-2 and 4-4 belong to the VLAN 6-2. It is also assumed that the identifier (ID) to which a terminal belongs in the radio LAN 1 is substantially equal to the ESSID used when the terminal connects to the access point 3. The access point 3-1 connects to the terminals 4-1 and 4-2, the access point 3-2 connects to the terminal 4-3, and the access point 3-3 connects to the terminal 4-4. Also, it is assumed that the terminal 4-1 establishes a radio link to the access point 3-1 using essid 1 as the ESSID, the terminal 4-2 establishes a radio link to the access point 3-1 using essid 2 as the ESSID, the terminal 4-3 establishes a radio link to the access point 3-2 using essid 1 as the ESSID, and the terminal 4-4 establishes a radio link to the access point 3-2 using essid 2 as the ESSID.

Although the identifier of a group is substantially equal to the ESSID in the first embodiment, it is also possible that the identifier of a group is substantially equal to another identifier such as a tag. For example, when the tag is substantially equal to the ESSID, since the tag is less in the quantity of information than the ESSID, there is obtained an advantage that the overhead is reduced in the communication. When an identifier different from the ESSID is employed, each access point can identify a group to which a packet belongs, by keeping therein a table indicating a correspondence between ESSIDs and group IDs.

Figure 7:
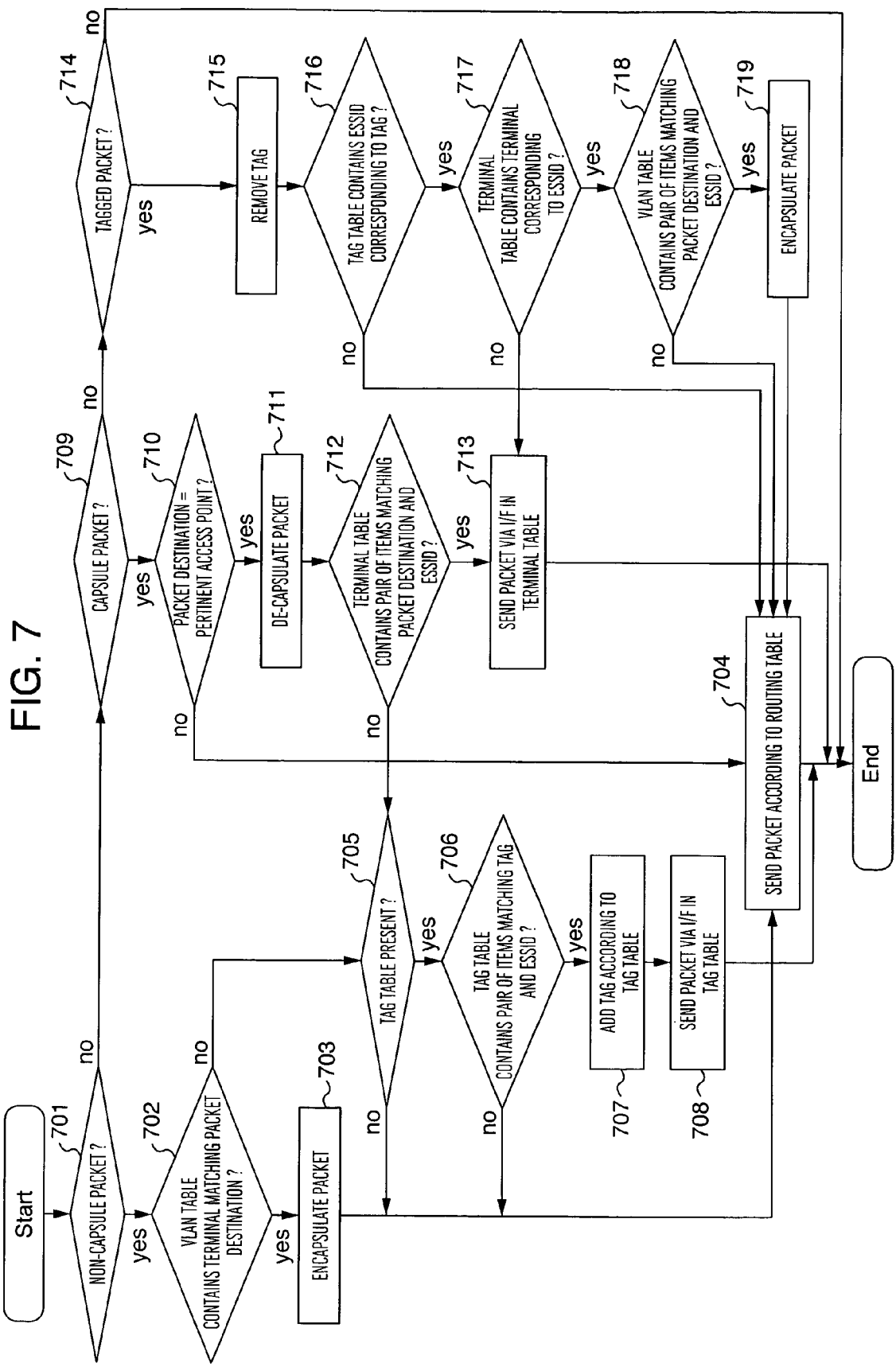
FIG. 7 is a flowchart showing a flow of packet processing by an access point.

FIG. 7 is a flowchart for the access point to execute packet processing. In the description below, the access point 3 conducts the processing. However, actually, the CPU 11 in the access point 3 executes programs loaded in the memory 12 to thereby conduct the processing.

When a packet is received from an external device, the access point 3 makes a check to determine whether or not the packet is a non-capsule packet (step 701). If the packet is a non-capsule packet, the access point 3 makes a check to determine whether or not the VLAN table includes a terminal matching the destination of the packet (step 702). If such terminal is present, the access point 3 encapsulates the packet (step 703) and sends the packet according to the routing table (step 704) to thereby terminate the processing. In the encapsulation, the access point 3 adds, to a first field of the packet, an IP address of the access point 3 to which the destination terminal is connected and adds, to a last field thereof, the ESSID as a group identifier of the destination terminal.

If the matching terminal is absent in step 702, the access point 3 makes a check to determine whether or not the tag table is present in the access point 3 (705). If the tag table is present, the access point 3 determines whether or not the tag table contains a pair of a tag and an ESSID matching the destination of the packet (step 706). If the tag is present, the access point 3 adds the tag to the first field of the packet according to the tag table (step 707) and transmits the packet through an interface described in the tag table (step 708) to thereby terminate the processing.

If the tag table is absent in step 705 and the tag is absent in step 706, control goes to step 704 to thereafter terminate the processing.

If the packet is other than the non-capsule packet in step 701, the access point 3 makes a check to determine whether or not the packet is a capsule packet (step 709). If the packet is a capsule packet, the access point 3 determines whether or not the destination of the packet matches the address thereof (step 710). If the destination matches the address, the access point 3 de-capsulates the packet (step 711) and then makes a check to determine whether or not the terminal table contains a pair of items matching the destination and the ESSID of the packet (step 712). If there exists such matching pair of items, the access point 3 transmits the packet via an interface described in the terminal table (step 713) and then terminates the processing. If such pair is absent, control goes to step 705. The processing flow thereafter is substantially the same as for the processing described above. In the de-capsulation, the access point 3 deletes the IP address of the access point added to the first field of the packet and the ESSID of the destination terminal added to the last field of the packet.

If the destination of the packet is other than the address of the access point 3 in step 710, the process goes to step 704 to thereafter terminate the processing.

If the packet is other than a capsule packet in step 709, the access point 3 makes a check to determine whether or not the packet is a tagged packet (step 714). If the packet is a tagged packet, the access point 3 removes the tag from the packet (step 715) and then determines whether or not the tag table contains an ESSID corresponding to the tag (step 716). If the ESSID is present, a check is made to determine whether or not the tag table contains a terminal corresponding to the ESSID (step 717). If the terminal is present, the access point 3 determines whether or not the VLAN table contains a pair of items matching the destination of the packet and the ESSID (step 718). If such pair is present, the access point 3 encapsulates the packet (step 719) and goes to step 704 to thereafter terminate the processing. If such pair is absent, control directly goes to step 704 to thereafter terminate the processing.

If the corresponding ESSID is absent in step 716 and the matching pair is absent in step 718, control goes to step 704 and then the processing is terminated.

If the corresponding terminal is absent in step 717, control goes to step 713 to thereafter terminate the processing.

If the packet is other than a tagged packet in step 714, the processing is terminated.

The above processing will be described by using a specific example. Assume that the access point 3-1 keeps the tables shown in FIGS. 3A and 4A, the access point 3-2 keeps the table of FIG. 3B, and the access point 3-3 keeps the table of FIG. 5A.

First, assume a case in which the terminal 4-2 sends a packet to the terminal 4-4. In this situation, the access point 3-1 receives a non-capsule packet from the terminal 4-2 (step 701). Since the destination address in the packet is the terminal 4-4, a check is made for presence or absence of a field including "table 4-4" in the VLAN table (step 702). In FIG. 3A, there exists "table 3-3" and its ESSID is essid2 and the access point for the connection is "3-3". The program adds (in encapsulation) the destination IP address of the access point 3-3 to the first field of the packet and essid2 to the last field thereof (step 703). Since FIG. 4A indicates that the next field 42 corresponding to the destination IP address 3-3 contains "3-2", the packet is sent to the access point 3-2 (step 704).

Next, the access point 3-2 receives the packet sent from the access point 3-1. Since the packet is encapsulated by the access point 3-1 (step 709), the program makes a check to determine whether or not the destination of the access point 3-2 is contained in the first field of the packet (step 710). However, the first field contains "AP3-3", the packet is sent to the access point 3-3 according to the VLAN table of FIG. 3B (step 704).

Thereafter, the access point 3-3 receives the packet sent from the access point 3-2. The first field of the packet contains the address of the access point 3-3. Therefore, the program removes (in de-capsulation) the destination IP address from the first field of the packet and the ESSID from the last field thereof (step 711). It is then confirmed that the terminal table of the access point 3-3 contains a pair of "destination 4-4" and "essid2" (step 712). The access point 3-3 then transmits the packet via an interface indicated as wlan1 in the I/F field to the terminal 4-4 (step 713).

Second, assume a case in which the terminal 4-3 sends a packet to the terminal 7. In this case, the access point 3-2 receives a non-capsule packet from the terminal 4-3. Since the destination is the terminal 7 of the VLAN 6-1, a search is made to determine whether or not the VLAN table includes an entry containing a field of "6-1" (step 702). FIG. 3B contains the field of "6-1", the associated ESSID field is "essid1", and an access point for the connection is "3-1". Therefore, the program adds (in capsulation) the destination IP address of the access point 3-1 in the first field of the packet and essid1 in the last field thereof (step 703). The packet is then sent to the access point 3-1 according to the routing table (step 704).

Subsequently, the access point receives the packet sent from the access point 3-2. Since the first field of the packet contains "AP3-1" as the destination, the program de-capsulates the packet (step 711).

Next, a search is made through the terminal table for the address of the terminal 7 (step 712). In this situation, the address is absent, and the program determines whether or not there exits a tag table (step 705). The tag table is present in this case and contains a pair of items including "6-1" (indicating the VLAN to which the terminal 7 belongs) and essid1 (which is the ESSID added to the packet; step 706). Therefore, the program adds the tag to the packet (in step 707) and sends the packet via an associated interface indicated as eth0 to the terminal IP address 6-1 (step 708).

Third, assume a case in which the terminal 4-1 sends a packet to the terminal 7. In this case, the access point 3-1 receives a non-capsule packet from the terminal 4-1. Since the VLAN table does not contain a terminal matching the packet destination (step 702), a check is made to determine whether or not there exists a tag table (step 705). In this case, there exists a tag table containing an address 6-1. Therefore, the packet is transmitted through processing similar to the processing above (through steps 706 to 708).

Fourth, assume a case in which the terminal sends a packet to the terminal 4-3. In this situation, the access point 3-1 receives a tagged packet from the terminal 7. The tag is removed from the packet (step 715). In this case, the tag table contains essid1 corresponding to the tag (step 716), the terminal table contains "terminal 4-3" corresponding to essid1 (step 717), and the VLAN table contains a pair or items matching the terminal 4-3 and essid1 (step 718). Therefore, the program adds the destination IP address of the access point 3-2 to the first field of the packet and essid1 to the last field thereof (step 719). The packet is then sent to the access point 3-2 according to the routing table (step 704).

As described above, the access points appropriately conducts the routing operation and hence there can be constructed a system which suppresses tremendous load imposed onto the networks. It is not required to separately arrange a managing server.

Second Embodiment

Description will now be given of the second embodiment in which the VLAN and terminal tables are dynamically constructed such that the communication is possible even when the access point of a terminal is changed because of movement of the terminal from a first position to a second position.

Figure 8:
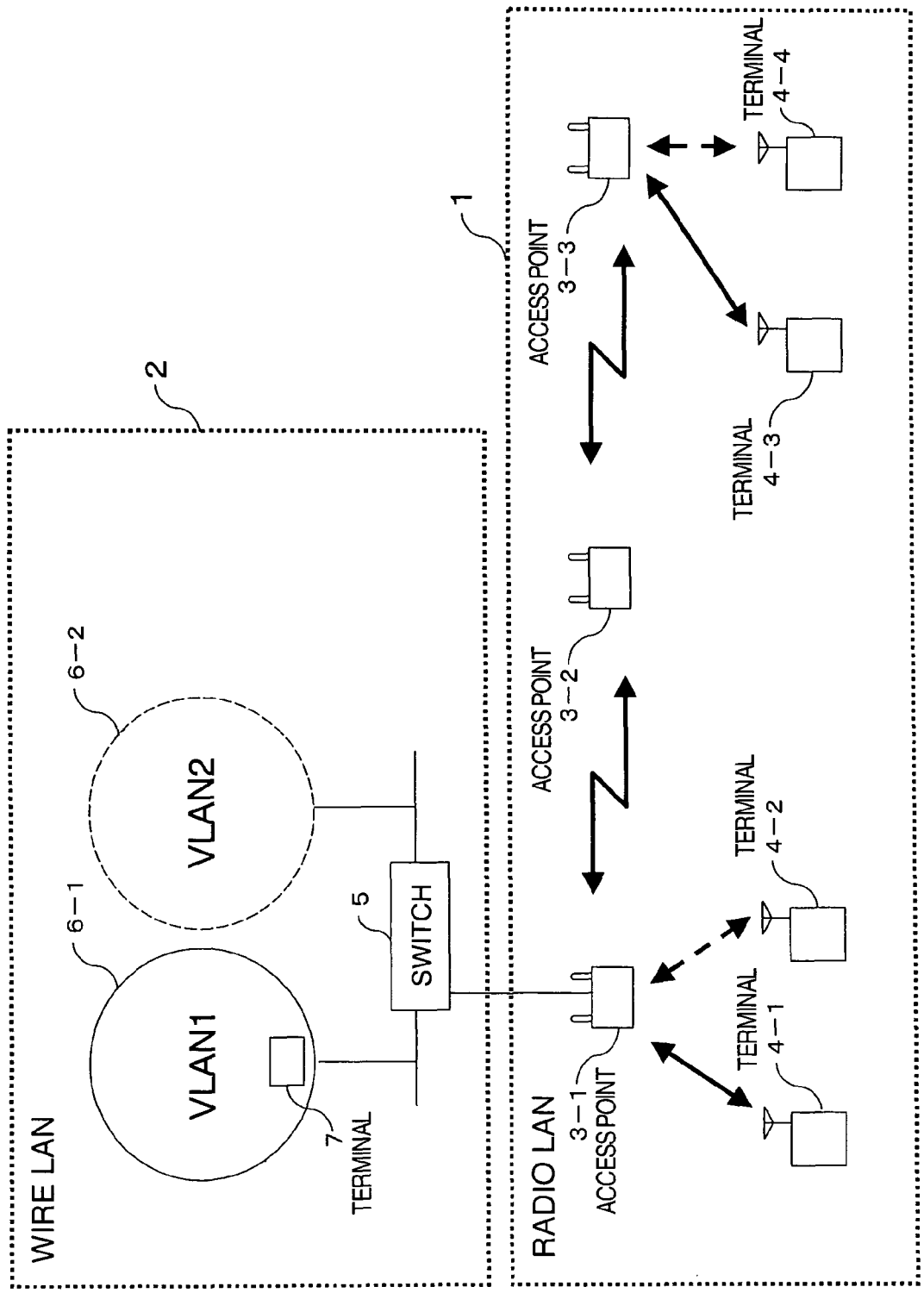
FIG. 8 is a block diagram showing a second network system.

FIG. 8 shows a second network system. This state appears when the terminal 4-3 moves from the position of FIG. 1 and the access point to be connected to the terminal 4-3 is changed to the access point 3-3.

According to the radio LAN standard, the access point 3-3 detects the terminal 4-3 of which the position is changed as above and establishes a radio link. The access point 3-3 then obtains an MAC address of the terminal 4-3 to execute new terminal broadcast processing.

Figure 9:
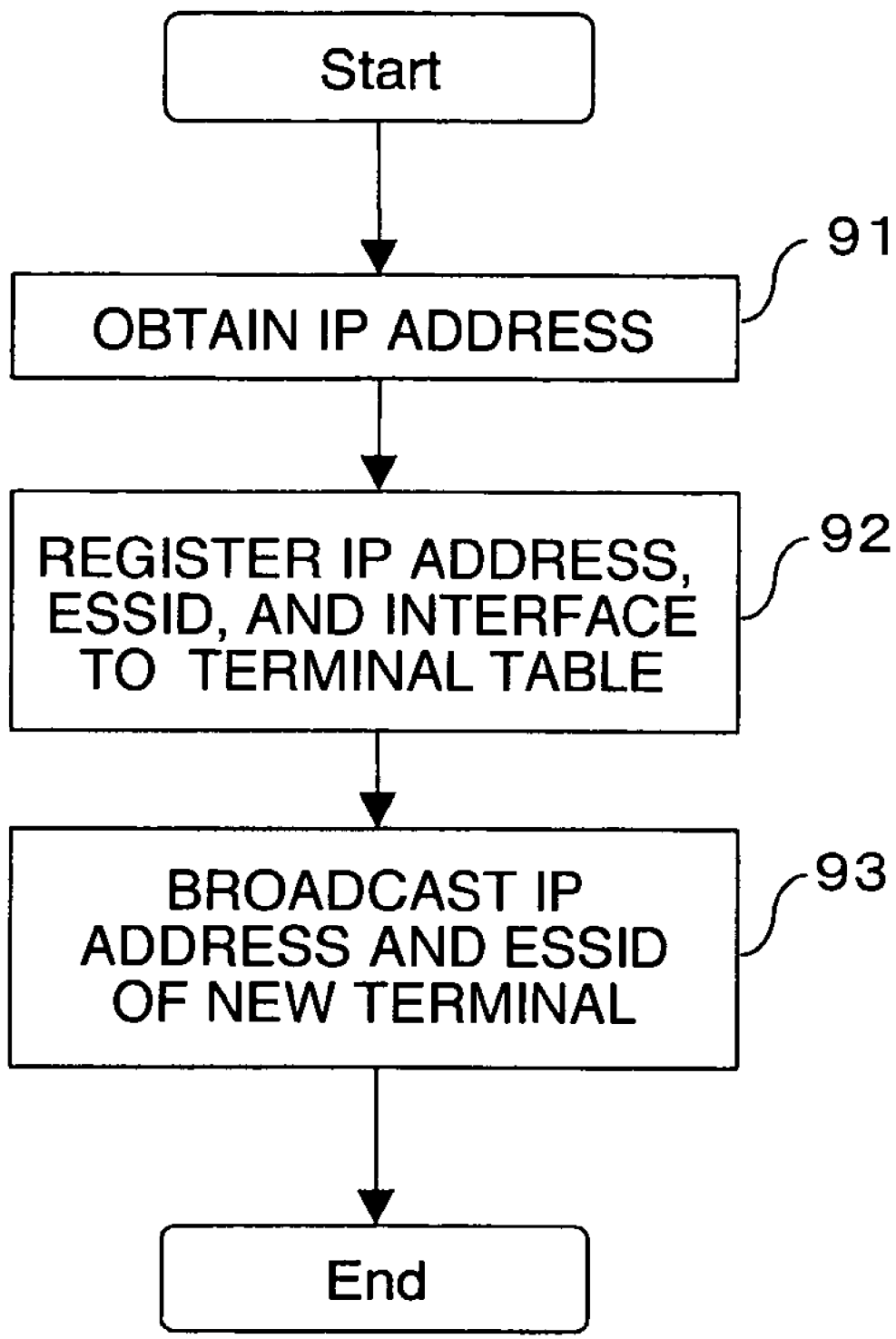
FIG. 9 is a flowchart showing a flow of new terminal broadcast processing.

FIG. 9 shows a flowchart of the new terminal broadcast processing.

Using the MAC address, the access point 3-3 obtains an IP address of the terminal 4-3 (step 91).

For the acquisition of the IP address, the access point may keep a correspondence table containing a correspondence between MAC addresses and IP addresses so that the IP address is obtained from the correspondence table. Or, it is also possible to store the correspondence table in a particular access point or a managing server with which the access point requiring the IP address can communicate so that the IP address is obtained through communication.

Next, the access point 3-3 registers to the terminal table the IP address and ESSID of the terminal 4-3 and the interface for which the radio link is established (step 92). In this situation, when the IP address of the terminal 4-3 is acquired, the access point 3-3 updates its own terminal table. Specifically, the state of the table is changed from that shown in FIG. 5A to that shown in FIG. 5B (the row containing "4-3" is added).

Subsequently, the access point 3-3 broadcasts the IP address and ESSID of the terminal 4-3 to the other access points (step 93). That is, according to the routing function of the ad hoc network, if each of the access points having received a control packet broadcast for the routing operation again broadcasts the control packet, the control packet can be delivered to all access points. It is also possible that the IP address and ESSID of the terminal 4-3 are delivered, to all access points, as one of the control packets for the routing operation of the ad hoc network.

In this connection, it is not necessarily required to broadcast all information items. That is, the MAC address is added as an identifier of the terminal to the table such that the MAC address and only the information required for the update are broadcast.

An access point having received the broadcast item executes table update processing. FIG. 10 shows the table update processing in a flowchart.

When the broadcast item is received, the access point 3-1 makes a check to determine whether or not its own VLAN table contains a pair of items matching the IP address and the ESSID of the terminal included in the broadcast item (step 1001). If such pair is present, the access point 3-1 updates the IP address of the access point to which the terminal connects (step 1002); otherwise, the access point 3-1 adds a pair of the IP address and the ESSID of the terminal to the VLAN table (step 1003).

Thereafter, the access point 3-1 makes a check to determine whether or not the terminal table of the access point 3-1 contains a pair of items matching the IP address and the ESSID of the terminal included in the broadcast item (step 1004). If such pair is present, the associated data is deleted from the terminal table (step 1005); otherwise, the processing is terminated with the terminal table kept unchanged. Since the VLAN table contains a pair of items matching the IP address and the ESSID of the terminal 4-3 in this situation, the access point 3-1 changes the indication of the access point for connection from "3-2" to "3-3". The terminal table does not contain "terminal 4-3" and hence the processing is terminated.

On the other hand, also the access point 3-2 receives the broadcast item. Since the terminal table of the access point 3-2 contains "terminal 4-3", the program deletes data associated with the terminal 4-3 (step 1005).

Not only when the position of the terminal is changed due to the movement thereof, but also when a new terminal is additionally installed, the communication can be conducted in the method of the first embodiment by updating the tables as above.

In accordance with the present invention, the routing operation can be appropriately carried out in the access points, and hence there can be provided a system which suppresses not impose tremendous load onto the networks.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An ad hoc network system, comprising:
a first relay;
at least one second relay which is coupled to the first relay via a network by way of another relay; and
one terminal which is coupled to the second relay via the network, wherein
the at least one second relay and the one terminal constitutes a virtual network, wherein
the first relay holds relay information indicating a correspondence established between an IP address of the at least one second relay, an IP address of the one terminal coupled to the at least one second relay via the network, and a group ID of a group to which the one terminal belongs, wherein
when the first relay receives information, the first relay extracts an IP address of a destination terminal to which the information thus received is transmitted and a group ID to which the destination terminal belongs, from the information thus received, then when the relay information includes the IP address of the second relay corresponding to the IP address and the group ID of the destination terminal, the first relay encapsulates the information thus received by adding the IP address of the second relay and the group ID of the destination terminal to the information thus received and transmits the information thus encapsulated to the second relay, and wherein
when the second relay receives the information encapsulated by the IP address of the second relay, the second relay de-capsulates the encapsulated information thus received and transmits the information thus de-capsulated to the one terminal coupled to the second relay in a case where the IP address and the group ID of the destination terminal respectively coincide with the IP address and the group ID of the one terminal coupled to the second relay.

2. The ad hoc network system according to claim 1, further comprising:
another terminal which is coupled to the second relay via the network, wherein
the first relay holds relay information indicating a correspondence established between an IP address of the first relay, an IP address of the another terminal coupled to the first relay via the network, and a group ID of a group to which the another terminal belongs, and wherein
when the first relay receives the information encapsulated by the IP address of the first relay, the first relay de-capsulates the encapsulated information thus received and transmits the information thus de-capsulated to the another terminal coupled to the first relay in a case where the IP address and the group ID of the destination terminal respectively coincide with the IP address and the group ID of the another terminal coupled to the first relay.

3. The ad hoc network system according to claim 1, wherein the another relay holds relay information indicating a correspondence established between an IP address of the at least one second relay, an IP address of the one terminal coupled to the at least one second relay via the network, and a group ID of a group to which the one terminal belongs, and wherein when the another relay receives information encapsulated by the IP address of the second relay which is transmitted from the first relay, the another relay transmits the encapsulated information thus received to the second relay in accordance with a routing table.

4. The ad hoc network system according to claim 1, further comprising:

a still another terminal which is coupled to the another relay via the network, wherein the another relay and the still another terminal and constitutes another virtual network different from the virtual network constituted by the second relay and the one terminal.

5. The ad hoc network system according to claim 4, wherein the IP address of the one terminal coupled to the second relay is same as an IP address of the still another terminal coupled to the another relay.

* * * * *